June 5, 1945. S. F. PASTURCZAK 2,377,807
CORN HARVESTER
Filed June 23, 1941 2 Sheets-Sheet 1

INVENTOR
Stanley F. Pasturczak
ATTORNEYS

INVENTOR
Stanley F. Pasturczak
BY
ATTORNEYS

UNITED STATES PATENT OFFICE 2,377,807

CORN HARVESTER

Stanley F. Pasturczak, East Moline, Ill., assignor to Deere & Company, Moline, Ill., a corporation of Illinois Application June 23, 1941, Serial No. 399,249

16 Claims. (Cl. 56—18)

The present invention relates generally to corn harvesters and has for its principal object the provision of a novel and improved mechanism for snapping ears of corn from the stalks without danger of damage to the ears. It is well-known to those skilled in the art that the Hybrid corn, which is in common use today, is extremely easy to shell, with the result that some kernels of corn are lost because of shelling at the snapping rolls of conventional corn pickers. It is likewise important when harvesting sweet corn to remove the ears without damaging them. For some years, therefore, it has been the problem of designers of corn harvesters to design snapping rolls which have a gentler action upon the ears of corn.

The fundamental principle of the present invention is that the machine does not engage the ears of corn at the time of snapping, but rather the stalks of corn are gripped by the machine and given a quick shake to dislodge the ears of corn, after which the stalks are discharged upon the ground. In the accomplishment of this object the stalks are gripped above and below the ear, between a wheel or pulley and a flexible belt trained over the latter. The belt and pulley are moving about the axis of the pulley, thereby giving a whipping action to the cornstalk which dislodges the ear of corn, which is caught in a suitable receptacle.

Figure 1:
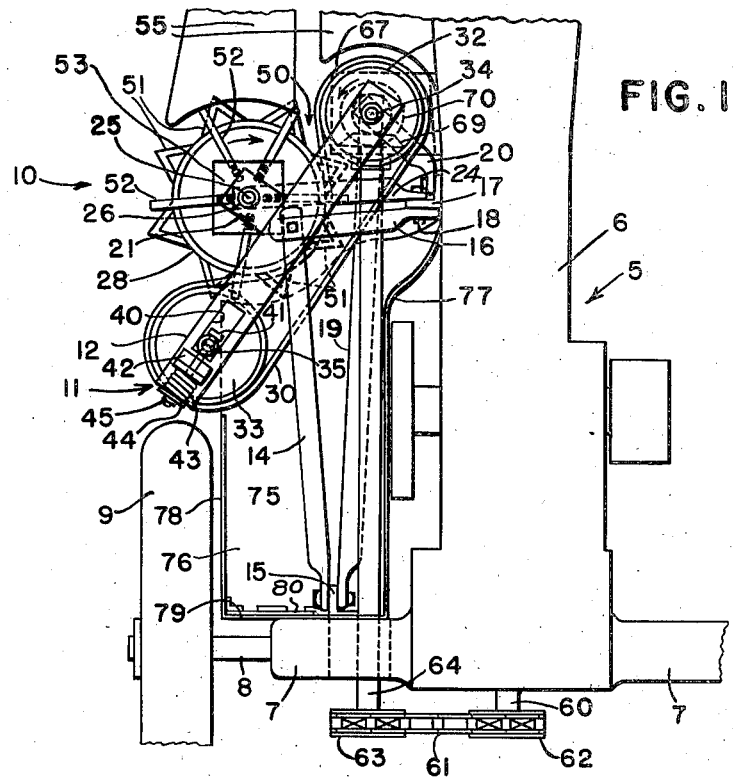
Figure 2:
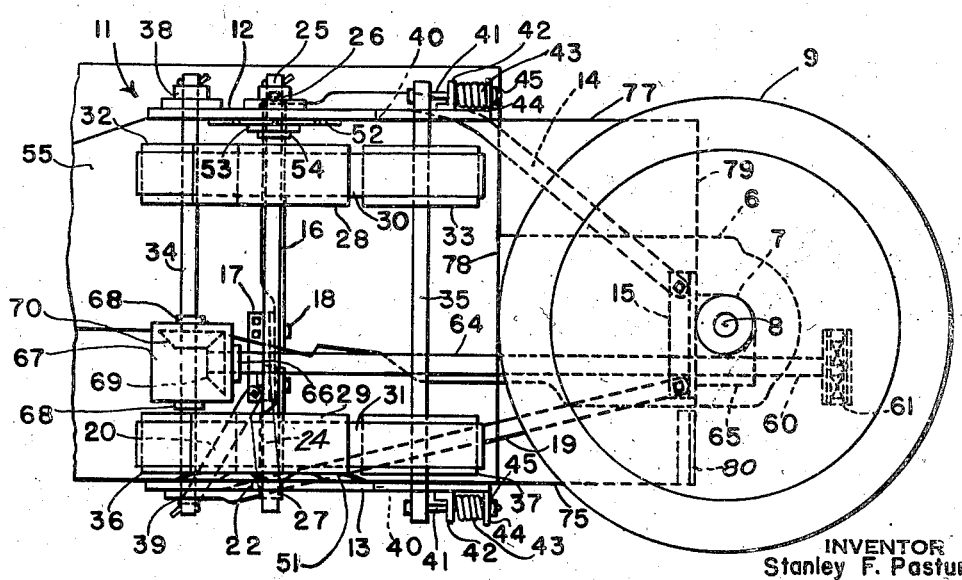
Figure 3:
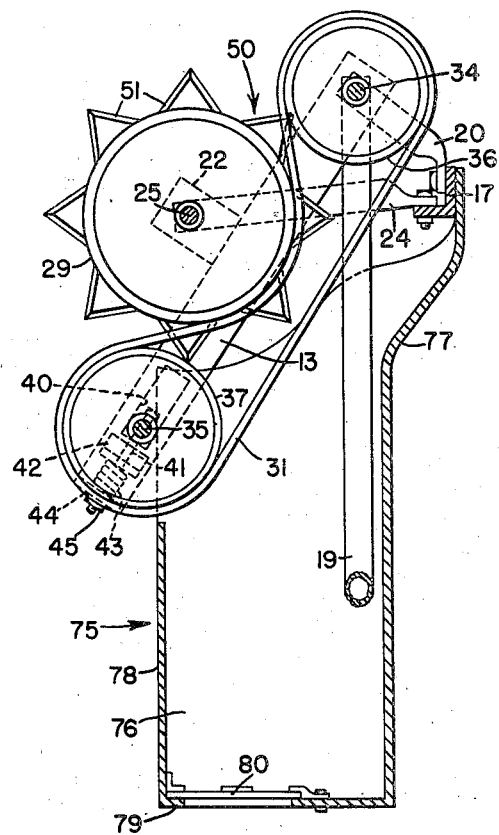

These and other objects and advantages of my invention will be apparent to those skilled in the art after a consideration of the following description, in which reference is had to the drawings appended hereto, in which Figure 1 is a fragmentary plan view of a tractor, on which is mounted a corn harvester embodying the principles of the present invention;

Figure 2 is a fragmentary side elevational view of the device shown in Figure 1; and Figure 3 is a sectional plan view taken along a line 3—3 in Figure 2.

Referring now to the drawings, the tractor, indicated in its entirety by reference numeral 5, is a conventional row crop type having a narrow longitudinally extending body 6, supported on a single dirigible wheel at the forward end (not shown), the rear end of the body 6 being carried on a pair of laterally extending oppositely disposed rear axle housings 7, within which are journaled axles 8 to which are attached a pair of rear traction wheels 9, respectively, one of which is shown in the drawings.

The corn harvesting implement, indicated generally by reference numeral 10, includes a rigid supporting frame 11 mounted on the side of the tractor 5 intermediate the front and rear wheels thereof. The frame 11 comprises a top plate 12 and a bottom plate 13 disposed generally parallel and in vertically spaced arrangement. The plates are supported on the tractor body by any suitable bracing means, such as by a longitudinally extending brace 14 bolted to the intermediate portion of the upper plate 12 and extending rearwardly and downwardly to a connection with a vertical bracket 15, which is fixed to a conventional implement supporting boss on the front surface of the axle housing 7. Another brace 16 extends from the upper plate 12 laterally inwardly and downwardly and is connected by bolt means 18 to a bracket 17 rigidly fixed to the side of the tractor body 6. The lower plate 13 is braced by means of a longitudinally extending brace 19 fixed at its rear end to the bracket 15 and extending forwardly and downwardly to a connection with the lower plate 13. Another brace 20 extends from the bracket 17 to the forward end of the lower plate 13. The frame plates 12, 13 are inclined forwardly and inwardly toward the tractor body from a point ahead of the traction wheel 9 and are provided with a pair of upper and lower bracket plates 21, 22 extending rigidly forwardly from their intermediate portions of the upper and lower frame plates 12, 13, respectively. A vertical shaft 25 is journaled at opposite ends, respectively, in the upper and lower bracket plates 21, 22 in journal bearings 26, 27. A brace 24 connects the brackets 17 and 22. Fixedly mounted on the shaft 25 is a pair of vertically spaced wheels or pulleys 28, 29, each of which has a wide, flat peripheral surface which engages a flexible endless member in the form of a flat belt 30, 31 of leather or fabric construction. The upper belt 30 is trained over a pair of pulley wheels 32, 33 which are mounted on vertical shafts 34, 35, disposed at opposite ends of the frame plates 12, 13, and supported at their upper and lower ends in said plates, respectively. Similarly, the lower belt 31 is trained around a pair of pulley wheels 36, 37, mounted on the lower ends of the two shafts 34, 35, respectively. The two pulley wheels 32, 36 are fixedly mounted in vertically spaced relation on the forward shaft 34, which is rotatably supported in journal bearings 38, 39 on the upper and lower plates 12, 13, respectively, while the other pair of vertically spaced pulley wheels 33, 37 are each independently journaled on the shaft 35, which extends through longitudinally disposed slots 40 in the plates 12, 13 and is supported at upper and lower ends, respectively, on a pair of horizontally disposed bolts 41. The bolts 41 extend through transverse apertures in the ends of the shaft 35 and extend rearwardly through a bracket 42 fixed to each of the plates 12, 13. A compression spring 43 encircles each of the bolts 41 behind the bracket 42 and bears against the latter and against a washer 44 secured at the rear end of each bolt 41 by a nut 45. Thus the compression springs 43 tend to urge the vertical shaft 35 toward the rear of the slots 40 to maintain the belts 30, 31 tight against the pulley wheels.

As indicated in Figure 1, the belts 30, 31 are trained over the two upper pulley wheels 32, 33 and pass around a portion of the periphery of the pulleys 28, 29, respectively, the outer surface of each belt engaging approximately one-quarter of the periphery of the pulleys 28, 29. The forward pulley wheels 32, 36 are spaced inwardly and slightly ahead of the wheels 28, 29 in order to provide a forwardly diverging stalk-receiving space 50 between each of the belts 30, 31 and their respective pulleys 28, 29, into which the cornstalks are crowded as the implement moves forwardly.

The stalks are severed from the ground by means of a plurality of radially outwardly extending knife blades 51 fixed to the lower side of the lower pulley 29 on the shaft 25. These knife blades 51 are rotated with the wheels 28, 29 in a clockwise direction, as viewed in Figure 1, and shear the cornstalks off near the ground, the lower frame plate 13 serving as a stationary cutter bar therefor. Simultaneously, the upper ends of the cornstalks are cut off by means of a plurality of radially outwardly extending arms 52, which serve to gather the stalks into the space 50 and also cooperate with the under surface of the upper frame plate 12 to sever the tops from the stalks. The arms 52 are rigidly fixed to a plate 53 which is attached to a hub 54 mounted on the shaft 25.

As the implement moves forwardly, the cornstalks are guided into the forwardly diverging space 50 by means of a pair of laterally spaced gatherers 55 of any suitable conventional construction.

Power is transmitted to drive the pulley wheels and belts from the power take-off shaft 60 of the tractor, which projects rearwardly from the central portion of the body 6, by means of a drive chain 61 trained over a sprocket 62 on the power take-off shaft 60 and also trained over a sprocket 63 which is fixed on the rear end of a longitudinally disposed power shaft 64. This power shaft is journaled near its rear end in a suitable bearing block 65 fixed beneath the tractor axle housing 7 and is journaled adjacent its forward end in a bearing 66 in a bearing housing 67, supported on the shaft 34 by means of bearings 68. A pair of bevel gears 69, 70 are disposed within the housing 67 in intermeshing relation and are fixed to the longitudinally disposed power shaft 64 and the shaft 34, respectively. Thus, by driving the vertically spaced forward pulley wheels 32, 36 through the shaft 34, power is transmitted through the belts 30, 31 to drive the wheels 28, 29, the rear pair of pulleys 33, 37 serving as idlers. Tension is maintained in the belts 30, 31 by the compression springs 43 which tend to force the idlers 33, 37 rearwardly and outwardly.

During operation the tractor moves forwardly down a row of crop, the stalks being received between the gatherers 55 and guided into the opening between the pulleys 28, 29 and the respective belts 30, 31, and are gripped securely therebetween. The knives 51 sever the stalks from the ground and the upper knives 52 sever the tops of the stalks as the latter are whirled rearwardly and outwardly between the wheels 28, 29 and belts 30, 31. This sudden shake is sufficient to snap the ears of corn from the stalks without the necessity of actually engaging the ears of corn and thus without any danger of shelling the kernels from the ears. The upper and lower belts 30, 31 are so spaced as to engage each of the cornstalks above and below the ears of corn.

The stalks are discharged from the belts and pulleys laterally from the side of the implement, while the ears are thrown by centrifugal force into a suitable hopper or receptacle 75, which comprises a floor 76, an inner side wall 77, an outer side wall 78, and a back wall 79. The hopper 75 is supported at its rear end on the front side of the axle housing 7 and at its forward end on the side of the tractor body and on the lower plate 13. The ears can be removed from the hopper by any suitable means known to those skilled in the art, represented by a door 80 in the back wall.

I do not intend my invention to be limited to the exact details shown and described herein except as set forth in the claims which follow.

I claim:

1. A corn harvester comprising a mobile frame, stalk severing means supported thereon, means mounted on said frame for gripping severed stalks at points spaced from the ears, means for bodily moving said gripping means abruptly for shaking the stalks to dislodge the ears therefrom, and means for catching and collecting said ears.

2. A corn harvester comprising a mobile frame, stalk severing means supported thereon, a rotary gripping member journaled on said frame, a flexible member trained around a portion of the periphery of said rotary member, means for guiding stalks between said members, means for urging said members together in gripping engagement with said stalks, means for rotating said rotary member to swing the stalks in an arc to dislodge ears therefrom, and means for collecting said ears.

3. A corn harvester comprising a mobile frame, stalk severing means supported thereon, a rotary gripping member journaled on said frame by means providing for rotation about a generally vertical axis, a flexible member trained around a portion of the periphery of said rotary member to receive stalks therebetween in a vertical position from said severing means, means for urging said members together in gripping engagement, means for rotating said rotary member to swing the stalks in an arc to dislodge ears therefrom, and means for collecting said ears.

4. A corn harvester comprising a mobile frame, stalk severing means supported thereon, a rotary gripping member journaled on said frame, a pair of wheels disposed on opposite sides of said rotary member and journaled on said frame on an axis parallel to the axis of said rotary member, a flexible endless member trained over said wheels and wrapped around a portion of the periphery of said rotary member to receive stalks therebetween in gripping engagement therewith, means for rotating said rotary member to swing the stalks in an arc to dislodge ears therefrom, and means for collecting said ears.

5. A corn harvester comprising a mobile frame, a pair of spaced pulleys journaled on said frame by means providing for rotation about generally vertical axes, an endless belt trained over said pulleys, a rotary drum mounted on said frame for rotation about a vertical axis and disposed in engagement with the outer surface of said belt and adapted to grip cornstalks therebetween during advance along a crop row, and means for driving said pulleys and said drum at a speed sufficient to dislodge ears from the stalks by centrifugal force as the latter are swung about the axis of said drum.

6. A corn harvester comprising a mobile frame, a pair of substantially vertical parallel shafts journaled on said frame in spaced relation, a pair of vertically spaced pulleys mounted on each of said shafts, a pair of endless belts disposed in vertically spaced relation and trained over said pulleys for generally horizontal movement thereupon, drum means engaging the outer periphery of each of said belts and rotatable about a vertical axis, said drum means and said belts being adapted to grip cornstalks therebetween at points above and below the ears on said stalks, respectively, means for severing said stalks from the field, means for driving said pulleys and said drum means at a speed sufficient to dislodge ears from the stalks as the latter are swung about the axis of said drum means, and means for collecting said dislodged ears.

7. A corn harvester comprising in combination, a tractor, a pair of upper and lower bearing supporting members mounted on the tractor between the front and rear wheels thereof, three parallel shafts disposed substantially vertically and journaled in said bearing supporting members, a pair of vertically spaced pulleys mounted on each of two of said shafts, a pair of endless belts disposed in vertically spaced relation and trained over said pulleys, respectively, drum means mounted on the third shaft and disposed in gripping engagement with the outer periphery of each of said belts for gripping each of said stalks above and below the ears thereon, a plurality of radially extending knives mounted on one of said shafts for severing the stalks from the field, a cutter bar fixed to said lower bearing supporting member and adapted to cooperate with said knives, means for driving said pulleys and said drum means at a speed sufficient to dislodge ears from the stalks as the latter are swung about the axis of said drum means, and means for collecting said dislodged ears.

8. A corn picker comprising a pair of spaced wheels journaled for rotation, a flexible endless member trained over said wheels and having an appreciable amount of slack, a third wheel rotatably disposed to bear against the outer side of said flexible member for taking up the slack therein, said flexible member and said third wheel being adapted to grip stalks therebetween, and means for driving said wheels at a speed sufficient to snap ears of corn from said stalks as the latter are gripped by said member.

9. A corn picker comprising a pair of spaced wheels journaled for rotation, a flexible endless member trained over said wheels and having an appreciable amount of slack, a third wheel rotatably disposed to bear against the outer side of said flexible member for taking up the slack therein, said flexible member and said third wheel being adapted to grip stalks therebetween, a plurality of radially extending blades connected with one of said wheels for rotation therewith for severing stalks from the ground, and means for driving said wheels at a speed sufficient to snap ears of corn from said stalks as the latter are gripped by said member.

10. A corn picker comprising a pair of spaced wheels journaled for rotation, a flexible endless member trained over said wheels and having an appreciable amount of slack, a third wheel rotatably disposed to bear against the outer side of said flexible member for taking up the slack therein, said flexible member and said third wheel being adapted to grip stalks therebetween, means for severing the stalks from the ground, means for cutting off the upper ends of said stalks, and means for driving said wheels at a speed sufficient to snap ears of corn from said stalks as the latter are gripped by said member.

11. A corn harvester comprising a mobile frame, stalk severing means supported thereon, vertically spaced movable gripping means for gripping the severed stalks at points spaced above and below the attached ears, simultaneously, means for bodily moving said gripping means abruptly to shake the stalks to dislodge the ears therefrom, and means for catching and collecting the dislodged ears.

12. A corn harvester comprising a mobile frame, stalk severing means supported thereon, pairs of vertically spaced movable gripping means for gripping the severed stalks at points spaced above and below the attached ears, simultaneously, means for moving said gripping means abruptly independent of said stalks to whip the ears therefrom, means for moving said gripping means together with said stalks to a point of discharge, means for moving said pairs of gripping means apart to release the stalks, and means for catching and collecting the dislodged ears.

13. An ear crop harvester comprising a stalk severing means, a pair of coactable gripping members movable toward each other to receive the stalks and firmly grip the stalks therebetween at a point spaced from the points of attachment of the ears thereon, means for moving said gripping members and thereby the stalks abruptly to shake the latter to dislodge the ears without striking and bruising the ears, and means for guiding the stalks to said stalk severing means and said stalk gripping means.

14. An ear crop harvester comprising a stalk severing means, a pair of coactable gripping members movable toward each other to receive the stalks and firmly grip the stalks therebetween at a point spaced from the points of attachment of the ears thereon, means for moving said gripping members, while in firm gripping engagement, in a curved path together with the stalks gripped thereby, to throw the ears off the stalks by centrifugal action, thereby dislodging the ears without striking and bruising the latter, and means for catching said ears, said gripping members being movable to a point of discharge, and means for moving said gripping members apart at said discharge point to release said stalks.

15. A corn harvester comprising a pair of laterally spaced gatherers, a pair of cooperative ear snapping members disposed behind said gatherers in vertically spaced relation to the connections of the ears to the stalks, and having relatively movable stalk engaging portions adapted to receive the stalks therebetween, means for angularly moving said members to cause said engaging portions to move the stalks abruptly laterally to shake the latter to dislodge the ears without striking and injuring the ears, and means adjacent said members for catching the ears thrown from the stalks.

16. A corn harvester comprising a pair of laterally spaced gatherers, a pair of cooperative ear snapping members angularly movable about relatively fixed axes and having peripherally movable stalk engaging portions disposed in vertically spaced relation to the supporting stems on the ears of corn and adapted to receive the stalks from said gatherers and engage laterally opposite sides of the stalks, means for driving said members to move said stalk engaging portions laterally to abruptly shift the stalks to dislodge the ears therefrom without striking and injuring the ears, and means adjacent said members for catching the ears thrown from the stalks.

STANLEY F. PASTURCZAK.